UNITED STATES PATENT OFFICE.

ABRAHAM T. HAY, OF BURLINGTON, IOWA.

IMPROVEMENT IN THE MANUFACTURE OF IRON AND WORKING AND WELDING OF STEEL.

Specification forming part of Letters Patent No. 156,220, dated October 27, 1874; application filed April 6, 1874.

*To all whom it may concern:*

Be it known that I, ABRAHAM T. HAY, of Burlington, in the county of Des Moines and State of Iowa, have invented certain new and useful Improvements in the Manufacture of Iron and Welding and Working of Steel; and I do hereby declare the following to be a full, clear, and exact description of the invention, such as will enable others skilled in the art to which it pertains to make and use it, reference being had to the accompanying drawings, which form part of this specification.

The nature of my invention relates to a new compound or flux to be used in reducing or decarbonizing crude or cast-iron for the manufacture of wrought-iron or steel, and for working or welding wrought-iron and steel; and it consists of a combination of metallic iron, aluminium, oxygen, and silicon, with traces of carbon, sulphur, and phosphorus, which I produce in the manner hereinafter described.

I take, by weight, fifty (50) parts of artificial peroxide of iron, or the natural oxide of iron known as Iron Mountain, Sheperd Mountain, or Pilot-Knob iron ores of Missouri, ten (10) parts of silicate of alumina, such as clay, old fire-bricks, &c., to which may be added a small percentage of wood ashes with thirty (30) parts of hard coke, or carbon in any other form.

This compound I subject to the action of a furnace, as set forth in United States Letters Patent granted to me November 19, 1872, No. 133,098, until thoroughly melted and combined; or I melt and combine the compound in any other convenient manner or apparatus. I obtain a yellow molten fluid, which, when properly cast in iron or other molds and cooled, forms the compound ready for use.

The flux thus obtained may be applied in any ordinary manner to the reduction or decarbonization of crude or cast iron for the manufacture of wrought-iron and steel, or to the working and welding of the same; but I have found the hereinafter-described processes to work best in practice, viz: In case I apply the compound to the reduction of cast-iron for the manufacture of wrought-iron or steel, I employ about five (5) per cent. of the same with one (1) per cent. of lime or limestone, both of which may be pulverized to any degree with the "straight red short" Missouri pig-iron. These I place in the ordinary charcoal bloom-forge, or other reducing-furnace, and work in the manner well known to ironworkers until it yields a metal capable of being rolled into bars or rods suitable for the finer grades of wire, tinner's rivets, &c.

When I use the compound for welding or working iron or steel I proceed as follows: I form a "pile" or "fagot" of spring or plow steel, and employ about four (4) per cent. of the compound as a flux in a pulverized condition. I heat the pile or fagot in the ordinary manner until it arrives at a welding heat, and then roll or otherwise work the mass into solid homogeneous bars or rods, which will be admirably adapted to the manufacture of wire, and for other purposes in which a low grade of steel is required.

By the employment of my improved flux I am enabled to work or weld old files and other high grades of steel in the ordinary blacksmith's forge with common "brassy coal," when contaminated with free sulphur, metallic paints, and other injurious impurities, which has hitherto been impossible, owing to the formation of sulphur compounds and deleterious metallic compounds which prevent a perfect weld.

In carrying out this part of my invention, I proceed in the old and well-known manner, using a small percentage of my compound or flux in the operation.

I do not limit myself to the precise proportions of the ingredients herein set forth in the formation of my compound, as they may be considerably varied and still answer the purposes of my invention; nor to any particular ferrugenious or aluminous substances, for they are found in various conditions in nature, and may be produced artificially; nor to any particular construction of furnace for carrying out my invention.

What I claim, however, is—

1. The within-described compound of iron, aluminium, oxygen, and silicon, as and for the purposes set forth.

2. The within-described process of decarbonizing or reducing crude iron or cast-iron in the bloom-forge or other furnace, by the use of the above-described compound or flux, substantially as and for the purposes set forth.

3. The within-described process of working and welding high steel in the ordinary blacksmith's forge by the use of said flux, substantially as and for the purposes set forth.

In testimony that I claim the foregoing I have hereunto set my hand this 1st day of April, 1874.

ABRAHAM T. HAY.

Witnesses:
P. HENRY SMYTH,
PHIL. M. CRAPO.